United States Patent [19]
Barkley et al.

[11] 4,037,264
[45] July 19, 1977

[54] MAGNETIC HEAD HOUSING WITH WEDGE LOCKING MEANS

[75] Inventors: John Allen Barkley; Neil Lloyd Robinson; Frank Boyd Shelledy, all of Boulder County, Colo.

[73] Assignee: International Business Machines Corporation, Armonk, N.Y.

[21] Appl. No.: 748,422

[22] Filed: Dec. 8, 1976

Related U.S. Application Data

[63] Continuation-in-part of Ser. No. 616,975, Sept. 26, 1975, abandoned.

[51] Int. Cl.² ............................................. G11B 5/105
[52] U.S. Cl. .................................................. 360/129
[58] Field of Search ................... 360/129, 128; 29/603

Primary Examiner—Robert S. Tupper
Attorney, Agent, or Firm—William N. Hogg

[57] ABSTRACT

This magnetic head construction includes two or more elements defining a transducing gap which are positioned and held together within a shell by a wedge.

The magnetic head assembly disclosed normally includes a shell structure, a pair of transducer elements defining a transducing gap, a wedge and a wedge follower. The wedge follower may be present as either a separate element or as a surface carried by one of the transducer elements. The assembly is normally formed by the process of disposing the transducer elements, and the wedge follower, if present, within the shell wall, and then rough positioning these elements within the shell, followed by the insertion of the wedge against the wedge following surface to bring the parts into final position in a locked relationship. Generally speaking, locking is achieved by selecting the wedge angle, $\theta$ as a function of the coefficients of friction of the mating surfaces according to given formulae.

This head structure and process requires no additional adhesive, glass, or other material to lock the parts of the structure together.

16 Claims, 4 Drawing Figures

MAGNETIC HEAD HOUSING WITH WEDGE LOCKING MEANS

BACKGROUND OF THE INVENTION

This is a continuation-in-part of application Ser. No. 616,975, now abandoned, filed on Sept. 26, 1975 entitled Magnetic head and Method of Manufacture.

The present invention relates to magnetic head structures useful for recording data and reading data from magnetic recording media. It also relates to methods of making such magnetic head structures.

Magnetic transducing heads have been in use since the inception of magnetic recording technology. Basically, most magnetic transducers are in the form of a magnetically permeable core member including at least one finite non-permeable discontinuity forming a transducing gap and at least one electrically conductive exciting winding associated with the cord. In operation, a changing magnetic field in close proximity to the transducing gap, such as that caused by relative motion of a previously recorded magnetic record media, causes an electrical signal to be generated in the associated conductor which signal is sensed by associated devices as a bit of information. Conversely, and electric current passing through the conductive winding causes a magnetic field to be generated within the core, which signal can be externally detected at the transducing gap as a magnetic field. A magnetic record medium in proximity to the gap at the time a magnetic signal is generated will retain the information imparted by this field in the form of a magnetic record. In another form magnetic transducer signals can be read from a previously recorded magnetic media by means of a single element which responds to a change in external magnetic field by a change in its electrical properties. Such transducers are represented by Hall effect and magnetoresistive sensors.

Traditionally, one type of magnetic transducer has been formed of gross pieces of ceramic and magnetically permeable ceramic material. In most instances such ceramic heads are formed by assembling the requisite pieces in the desired sizes and shapes and then bringing them together in a series of steps, often in one or more specially designed fixturing jigs, and then combining the various parts of the structure. Normally the parts of the structure are held together by a combination of bolts, adhesives, or specially selected fused material such as glass, quartz, silicon dioxide, silicon monoxide or enamel, for example. These fused materials are incorporated into the structure in a number of ways, including the use of foils which are melted in place, or by the location of these materials adjacent to openings in the head structure followed by melting which causes the material to flow into the openings due to capillary action, or by the coating of materials on the to-be-mated surfaces, for example by the expedient of a coated dispersion, or a vacuum deposited or sputtered coating. Combinations of these bonding techniques have also been used.

In each instance the use of bonding materials requires one or more steps. Where adhesives are utilized, problems of removing excess glue are sometimes encountered. In instances where bonding is obtained by fusion, the heating and cooling of the head generates internal stresses due to differential coefficients of expansion between various parts. This in turn results in an effort to match coefficients of expansion, which then limits the materials which can be used.

Mechanical locking arrangements such as those provided with bolts or screws avoid many of these problems. However, in heads including many parts or requiring precision location of parts such mechanical devices have proved inadequate due for example to their size, or to the unequal distribution of forces resulting from their use. Size is especially a limiting factor in the use of standard mechanical devices to secure parts in miniature of batch fabricated magnetic heads.

In one prior art head structure, U.S. Pat. No. 3,761,641, a magnetic head including a wedge had been noted. However, in the structure therein disclosed the wedges serve the function of a structural reinforcement and in no way provide a positioning or locking function.

SUMMARY OF THE INVENTION

In accordance with this invention, a magnetic head construction is provided which is comprised of a restraining shell including transducing elements positioned to form a transducing gap by a wedge which wedge also locks the parts together without the need for additional bonding components. In the preferred embodiments of this invention the transducer elements are ceramic and include combinations of magnetic and nonmagnetic ceramic materials. In another embodiment of this invention batch fabricated materials are supported on rigid elements and located in the transducing gap by the wedge action.

Generally, the wedge component of the head in combination with the other head elements provides both support and location of the transducer elements within the shell. This includes both control of the width of the transducing gap and means to lock the head components into a solid unitary structure without the need for the use of additional adhesive or bonding materials or other mechanical locking means. The wedge members engagement between the head shell and the wedge follower surface are between any rigid component and the wedge follower surface forces the head components to move against one another and against the inner surface of the shell accurately locating their final positions and the effective widths of the transducing gap while locking the components against movement or separation without the use of any other bonding means. Thus, a single wedge member replaces the use of bonding materials or other mechanical locking means, thereby replacing either a number of mechanical parts or substantial amounts of bonding material and the requisite multiple steps required for their use. Thus the same functions are performed, that is the construction and bonding of a head structure, with fewer parts or fewer steps than are utilized in the art known structures and processes.

The main object of the invention then is to provide a simplified magnetic head structure that uses fewer parts and fewer steps in its manufacture, thus providing ease of manufacture and reduction of costs.

Another object of this invention is to provide a head structure wherein a wedge member provides both means for achieving location and contact of the elements defining the transducing gap while also providing locking closure to the head without the need for the use of other bonding materials or locking parts.

Yet another object of this invention is to provide a structure suitable in constructing and accurately locating miniature or batch fabricated head components within a transducing gap.

Still another object of this invention is to provide a head structure including a shell and a number of component parts within the shell defining a transducing gap, wherein the parts are locked within the shell structure by a wedge against a wedge follower surface wherein, the wedge angle of the wedge, $\theta$, is determined as a function of the coefficients of friction of the mating surfaces. The theoretical wedge locking angle is such that:

$$\tan \theta \leq \frac{r_1 + r_2}{1 + r_1 r_2}$$

wherein $\theta$ is the wedge locking angle, $r_1$ is the coefficient of friction between the mating wedging surfaces, and $r_2$ is the coefficient of friction between other mating surfaces of the elements; however, because of other factors, the preferred design equation for the wedge locking angle is such that:

$$\tan \theta \leq r_1$$

The foregoing and other objects, features and advantages of the invention will be apparent from the following more particular description of preferred embodiments of the invention as illustrated in the accompanying drawings.

DESCRIPTION OF THE PREFERRED EMBODIMENT

In carrying out the present invention, the actual materials utilized in forming the head and transducing gap, as well as the shape of the components will be controlled by design requirements and the ultimate use to which the structure is to be put.

The transducer elements utilized in the present invention are preferably rigid, but are not necessarily solid. They may be totally magnetic, partially magnetic or totally nonmagnetic while carrying magnetic components upon their gap face. Included within the materials which are suitable for providing transducer elements are ceramic, glass, quartz, nonmagnetic ferrite, magnetic ferrite or other materials of choice. Where the transducer elements include magnetic materials on their gap faces other than magnetic ceramics or ferrites, useful materials include nickel-iron alloy compositions, including many compositions containing 1% to about 15% of one or more added elements such as molybdenum, chromium, manganese, copper, vanadium, titanium, silicon, aluminum and tungsten. Also included are the iron-nickel-cobalt compositions, including compositions containing 1% to about 15% of added elements. Other suitable materials include iron-cobalt alloys. Generally, these materials are magnetically soft and permeable. Other suitable materials include most other magnetically permeable alloys which can be deposited, batch fabricated or produced in the form of foils.

Where such metallic materials are utilized on the gap face of the transducer element it is often desirable to provide the gap face with insulation or spacing material prior to the placement of the magnetic material. Nonmagnetic nonconductive materials may be provided to perform this function by a number of well known techniques including conventional coating, vacuum deposition and sputtering. Suitable nonmagnetic, nonconductive materials include various plastics and polymers, silicon monoxide, silicon dioxide, quartz and aluminum oxide. However, in some instances, it may be useful and desirable to deposit the magnetic material directly on the gap face of the transducer element.

Figure 1:
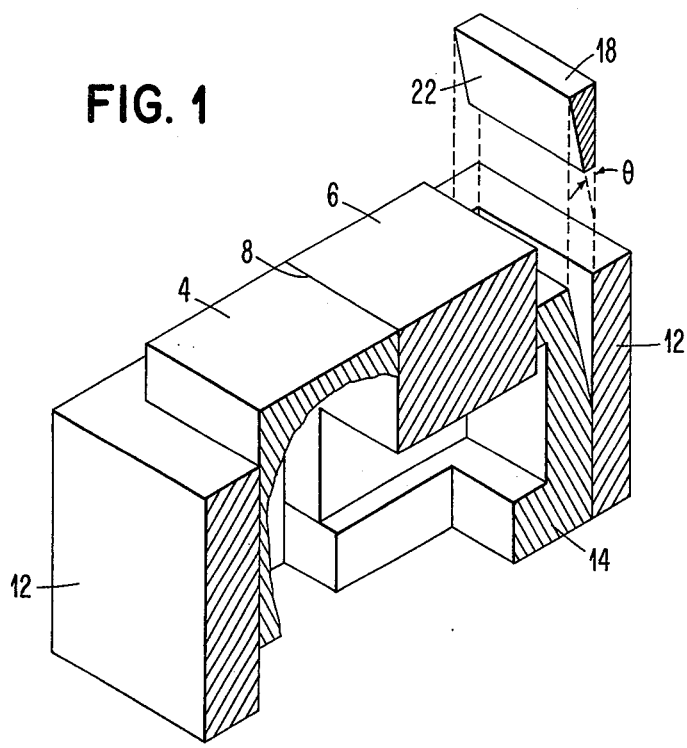
FIG. 1 is a perspective, sectional, partly exploded, partly broken away view of a magnetic head made in accordance with the present invention.

Referring to FIG. 1, magnetic head structure 2 made in accordance with the present invention may consist of a plurality of transducer elements 4 and 6 defining a transducing gap 8 which operates to read from or write on a magnetic recording medium, not shown. Transducer elements 4 and 6 are located within head shell 12. In this preferred embodiment a separate wedge follower 14 is also located within the shell and includes wedge follower surface 16. Final location of the parts within the head and locking is provided by truncated closing wedge 18, shown in exploded relation to the head structure. Wedge 18 includes a wedge surface 22 which interacts with wedge follower surface 16 to provide locating and locking of the head components within the shell. Also the wedge 18 has a surface 21 which slidably coacts with surface 23 on shell 12. Wedge 18 is also characterized by a wedge angle $\theta$, extended. Wedge angle $\theta$ is selected to provide a mechanical relationship between the parts so that locking is achieved when wedge 18 is inserted and is also generally selected to be supplementary to the bevel angle defining wedge follower surface. Of course, in a more realistic sense the bevel angle of wedge follower 16 is actually dictated by the angle of wedge 18.

The relationship between the wedge angle $\theta$ and the achievement of locking of the wedge against translational movement, i.e., nonrotational movement is such that:

$$\tan \theta \leq \frac{r_1 + r_2}{1 + r_1 r_2}$$

Wherein $r_1$ is the coefficient of friction between the wedge surface 22 and the wedge follower surface 16, and wherein $r_2$ is the coefficient of friction between surface 21 on the wedge 18 and surface 23 on the shell 12. This equation is valid and if the design complies therewith this will be no translational movement of the wedge 18, and to this extent the equation defines the theoretical critical wedge locking angle. However, this equation does not take into consideration the possible translational movement of the other elements, i.e., the wedge follower 14, the shell 12 and the transducer elements 4 and 6. In such a case the coefficient of friction between the mating surface of the elements must be substituted for $r_2$ to determine the assurance of locking. Further, this equation does not consider the possibility that with certain geometric configuration, rotation of the wedge or locked elements is possible. The problem of rotational movement is statically indeterminate.

In order to overcome both of the above limitations to the basic equation i.e., the problem of possible translational movement of the other elements, and the problem of possible rotational movement of some element, the coefficients of friction on all the surfaces other than that of the surfaces 16 and 22, $r_1$ is assumed to be a minimum i.e., zero. This will assure no translational movement of any elements, including the wedge, and no rotational movement of any of the elements. The equation above then becomes:

$$\tan \theta \leq r_1$$

which is considered to be the preferred design equation for the wedge angle.

In preferred embodiments wedge follower 14 and wedge 18 are hard metals such as titanium or stainless steel. For example, where both wedge follower 14 and wedge 18 are composed of titanium and prepared in accordance with standard machining operations the coefficient of friction between the wedge and the wedge follower surface is found to be about 0.27. The angle having a tangent corresponding to about 0.27 is 15°. Thus, where the wedge follower and wedge are titanium a wedge having a wedge angle $\theta$ of about 15° or less is required to obtain locking when the wedge is inserted into the head structure.

In a given structure locking force tends to increase as the angle $\theta$ of the wedge is decreased. Therefore surface defects and variations in the frictional nature of the surface, can be most easily accommodated by utilizing a small angle $\theta$ to exert greater locking force. However, the tolerance or safety factor provided by the selection of any angle less than $\theta$ should not be overdone since, the smaller the wedge angle, the greater the distance the wedge must be moved in order to lock the head components together. This in turn would require greater surface areas of the wedge and wedge follower over which close finish tolerances must be held in order to assure that the parts mate and lock properly, which would increase the cost of the parts. Taking all of these factors into consideration a wedge angle of about 11° has been found to be satisfactory when utilizing both a wedge and wedge follower of titanium. Force required to insert the wedge into locking relationship is nominal, normally under about 10 pounds for such a combination of angles and materials.

In one form of the head embodiment disclosed in FIG. 1 transducer elements 4 and 6 may be composed totally of magnetically permeable material, thus providing a transducing effect along the entire length of transducing gap 8. Similarly elements 4 and 6 may be utilized, as shown in FIG. 1, extending above the shell structure, or elements 4 and 6 may be machined and lapped by known techniques to form a smooth continuous surface with shell 12. The surface character and finish is a matter of choice which does not effect the present invention.

Figure 2:
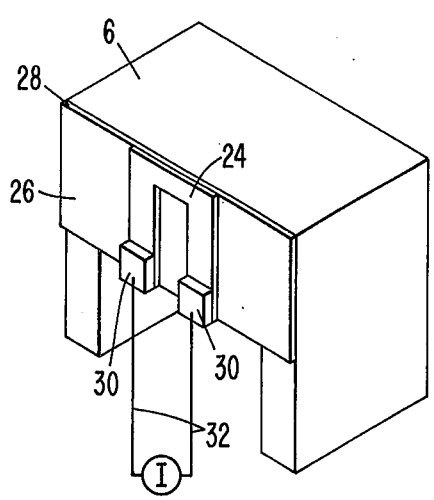
FIG. 2 is a perspective exaggerated view of a transducer element of the head of this invention wherein a batch fabricated magnetic element is carried on the gap face of said transducer element.

In another preferred embodiment shown in exaggerated detail in FIG. 2 transducer element 6, no longer shown in section, carries a batch fabricated magnetic portion 24 on its gap face 26. As shown, magnetic portion 24 resides on and is spaced and insulated from the main body portion of element 6 by nonmagnetic nonconductive insulating material 28. The relative dimensions of magnetic portion 24 and spacer 28 are exaggerated for purposes of clarity. Where magnetic material 24 is magnetoresistive of Hall effect material it is capable of providing a read function in the form shown without the need to form a magnetic circuit or gap with other magnetic material. Where magnetic materials 24 is magnetoresistive and transducer elements 4 and 6 are magnetic a shielded magnetoresistive structure as described in U.S. Pat. No. 3,881,190 are provided. Also, as in the structure of U.S. Pat. No. 3,881,190, conductive lands 30 deposited on element 24 have wire leads 32 connected to them. Other art known magnetoresistive structures, including structures utilizing a plurality of magnetoresistive foils may also be utilized in this structure, the only requirement being that the magnetoresistive are located and locked in place at the transducing gap by the wedging structure and action taught by the present invention.

In another modification, also illustrated by FIG. 2, magnetic portion 24 may be brought into close contact with a similar magnetic element, not shown, carried on the gap face of transducer element 4. In this instance, with the provision of a nonmagnetic gap between the two magnetic elements a batch fabricated read or write head is provided. While the thickness of magnetic foil 24 is exaggerated in FIG. 2 surface irregularities introduced by the buildup of components on the gap faces of transducer elements 4 and 6 can be either ignored, or they may be avoided or minimized by deposition of suitable additional nonmagnetic nonconductive materials to provide a substantially smooth, flat or complementary surface to the mating portions of the transducer elements surface.

Figure 3:
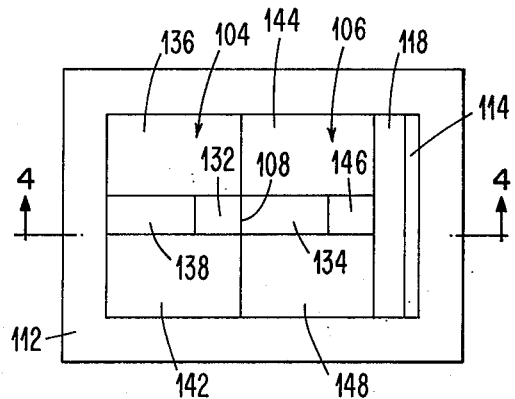
FIG. 3 is a top plan view of another type of magnetic head made in accordance with the present invention.
Figure 4:
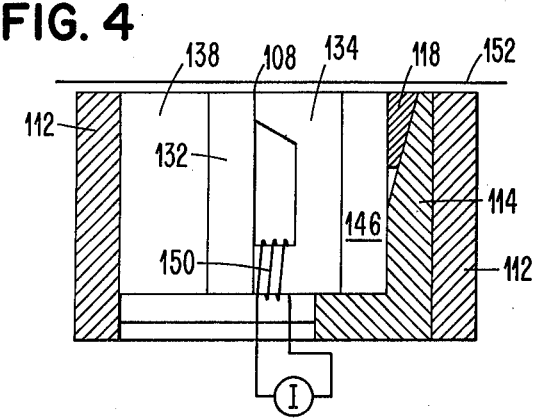
FIG. 4 is a sectional view on line 4—4 of FIG. 3 showing the magnetic core structure of the head of FIG. 3, a modified form of wedge follower, a different wedge location and a magnetic recording media in conjunction with the head.

In another modification of the present invention best illustrated by reference to FIGS. 3 and 4 a magnetic head including a read or write track narrower than the entire width of transducer elements 104 and 106 provided. In this embodiment, both elements 104 and 106 are comprised of a plurality of components including relatively narrow magnetic portions 132 and 134 monolithically joined to other elements to provide a pair of rigid transducer elements. For example, where magnetic components 132 and 134 are magnetic ferrite or ceramic materials, additional supporting structure including segments 136, 138, 142, 144, 146 and 148 are provided in the form of nonmagnetic material, such as ceramic, having similar properties of hardness and thermal expansion matching the properties of the magnetic ceramic or ferrite elements 132 and 134. The various elements comprising transducer elements 104 and 106, as shown in FIGS. 3 and 4, are monolithically joined and bonded to one another utilizing well known adhesive or glassing techniques, for example. However, final closure of transducer elements 104 and 106, including final location and locking of the elements to define transducing gap 108 is provided by means of wedge 118. Incidentally, it will be noted that in this embodiment wedge 118 rides directly against transducer element 106 rather than against shell 112. Also, in this embodiment, wedge follower 114 abuts shell 112. The extension of a portion of wedge follower 114 beneath transducer element 106 provides another, although optional, degree of support and location for transducer element 106. It will also be noted that conductive coil 150 on magnetic portion 134 provides sensing or energizing to the magnetic core for reading from or writing on magnetic recording medium 152 at transducing gap 108.

While several modifications of the present invention have been described, in view of the teaching herein many other modifications are possible and within the skill of the art. For example, the head shell need not be rectilinear. In some instances circular, eliptical, or irregular shaped shells will be most suitable for the design function required. In those instances some modification of the transducer elements, and possibly the wedge or wedge follower may be required in order to provide adequate lateral support and contact between the inner wall surface of the shell and the components within the shell. However, such modifications may be easily obtained within the teaching of the present invention while providing adequate support, alignment, and contact between the various parts. The only requirement is that when the wedge is inserted into the structure rigid lateral opposition to the wedge is provided by the shell and the component parts within the shell. Another modification of the shell which is within the scope of the present invention would be the utilization of discontinuous shell including a gap at some portion. While this would not normally be beneficial, shell materials of suitable strength and rigidity which will function adequately within the teaching of this invention are known. Two forms of wedge follower have already been shown. Other modifications of the wedge follower can also be made to provide varying degrees of location and support for the components of the head. It is also possible to carry out the teaching of the present invention without the requirement for a separate wedge follower element. For example, referring to FIG. 1, wedge follower 14 could be excluded from the structure by the expedient of having a wedge following angle beveled on the face of transducer element 6 opposed to face 26. Thus it is clear that the present invention may be adequately practiced without the provision of a separate wedge follower. For example, by either bringing the face of shell 12 closer to such a modified transducer element 6 or by increasing the width of wedge 18, a structure similar to that of FIG. 1 can be produced and function adequately without a separate wedge follower.

Other modifications include the use of other than a flat wedge. For example, a cone or semicone could be utilized to prove the same function as a wedge having flat surfaces. The system could also be modified to use more than one wedge. Another modification would include the provision of a wedge which effectively rides at an angle to both the wedge follower surface and another surface, such as that of the shell or the transducer element.

While several types of ceramic and batch fabricated heads have been illustrated, generally any head structure requiring the bringing of elements together to define a transducing gap can utilize the process and structure of the present invention. Also the number of transducers or tracks carried by each element can be multiplied as desired. In another modification a center section can be introduced as an additional transducing element to provide separate read and write transducers in the same structure. Any number of transducing elements can be provided to define any standard head structure, the elements being placed within a shell and locked in place by a wedge as taught by the present invention.

Where desired, any of the well known potting materials, such as silicon rubber or epoxy, may be inserted into any open nonfunctional portions of the head 2 of FIG. 1. However, where such materials are utilized they are provided primarily to enhance rigidity and avoid contamination and are not required in order to bond the head components together.

General electrical connections, terminations, and windings are shown in several of the embodiments of the present invention. Such electrical connections are known in the art and require no detailed discussion.

It is thus seen that in accordance with the present invention magnetic heads can be provided which provide a simplified structure having fewer parts, requiring less process steps, and capable of production at reduced costs. Magnetic head structures are also provided wherein the location and locking of the head components to produce a transducing gap is provided by the use of a closing wedge. Modifications of the head utilizing batch fabrication and miniaturization techniques are also taught. The relationship between the wedge angle and the coefficient of friction required to obtain these results is also set forth for the simplest cases. While the simplest process of manufacture sold appear to include the insertion of the closing wedge into the structure last, it is clear that other sequences of operation are possible while still providing the same results. It is also, of course, possible to reverse the several parts, including the insertion of the wedge from below the functional face of the magnetic head, rather than from above.

While the invention has been particularly shown and described with reference to preferred embodiments thereof, it will be understood by those skilled in the art that various changes in form and details may be made therein without departing from the spirit and scope of the invention.

What is claimed is:

1. A magnetic head structure comprising:
    a shell defining an opening including an inner wall surface;
    a first rigid transducer element located within said shell, said element including a surface portion abutting the inner wall surface of said shell, said element also including a second surface portion generally opposed to its first surface portion;
    a second rigid transducer element located within said shell, said element including a first surface portion juxtaposed to said second surface portion of said first element, an insulating layer between the second surface of the first element and the first surface of said second element and in contact with both said surfaces, said second element also including a second surface portion generally opposed to its first surface, said juxtaposed surface portions of said first and second transducer elements defining a transducing gap;
    transducer elements positioniong and locking means including a wedge follower surface located within said shell, and a wedge, said wedge and said wedge follower surface carrying means located within said shell, each including a first face portion in abutting and sliding relationship to one another and each having a second surface portion generally opposed to their respective first surface portions, said second surface portions also generally opposed to said transducing gap and said inner wall surface of said shell respectively, said positioning elements engaging said second transducer element and a portion of said shell inner wall surface to transmit a lateral force positioning and locking all of said elements within the inner wall surfaces of said shell and wherein the wedge in generally planar and the wedge angle of said wedge is $\theta$ and is defined by the formula tan $\theta \leq$ the coefficient of friction between the wedge and wedge follower abutting surfaces.

2. The magnetic head structure of claim 1 wherein said wedge follower surface carrying means is a separate element.

3. The magnetic head structure of claim 1 wherein said wedge follower surface carrying means is a separate element.

4. The head structure of claim 1 wherein said first and second transducer elements are selected from the group consisting of magnetic ceramic and ferrite.

5. The magnetic head structure of claim 1 wherein a thin film structure is provided within the transducer gap.

6. The magnetic head structure of claim 3 wherein said wedge and wedge follower are selected from the group consisting of stainless steel and titanium.

7. The magnetic head structure of claim 6 wherein the wedge and wedge follower are titanium, the coefficient of friction between the wedge follower surface and the wedge is about 0.27, and wherein $\theta$ is no greater than about 15°.

8. The head structure of claim 2 wherein said wedge follower is adjacent said second transducer element and said wedge is disposed between said wedge follower and and inner wall surface portion of said shell.

9. The head structure of claim 2 wherein said wedge is adjacent said second transducer element and said wedge follower is in contact with an inner wall surface portion of said shell.

10. The structure of claim 1 wherein transducing circuitry is included in said structure.

11. A magnetic recording system wherein the head structure of claim 1 is in transducing relationship with a magnetic recording media.

12. A magnetic head structure comprising:
a shell;
a plurality of transducer elements disposed within said shell;
wedge means and wedge follower means within said shell having mutually engaging surfaces, said means engaging said transducer segments and said shell to position said transducer segments to define at least one transducing gap and to lock said segments within said shell said wedge having an angle $\theta$ wherein tan $\theta \leq$ the coefficient of friction between the engaging wedge and wedge follower surfaces.

13. A method of manufacturing a magnetic head structure including at least two rigid transducer elements defining at least one transducing gap and a shell defining an opening for receiving said transducer elements, comprising the steps of:
providing transducer element positioning and locking means including a wedge follower surface and a wedge within said shell opening in juxtaposition to said transducing elements and having a surface in engagement with said wedge follower surface to transmit a lateral force positioning and locking all of said elements within the inner wall surfaces of said shell, and providing said wedge with an angle $\theta$ wherein tan $\theta \leq$ the coefficient of friction between the engaging wedge surface and wedge follower surface.

14. A magnetic head structure comprising:
a shell;
a plurality of transducer elements disposed in said shell in juxtaposed relationship, means interposed between said elements defining a transducer gap, a wedge element and wedge follower element disposed within said shell and including mating wedging surface means in sliding contact disposed to provide uniform lateral movement of one of said elements in its entirety upon sliding contact movement of the surfaces of said elements, one of said members having engaging surface means in contact with a mating engaging surface of one of said elements to provide locking engagement,
whereby upon sliding movement of said wedging surfaces lateral movement of the entire mating surface on the member maintains surface contact with the engaged mating surface on the element to provide uniform lateral pressure on the mating surface of the transducer element.

15. The invention as defined in claim 14, wherein a separate wedge follower element is provided which has the mating surface thereon, and wherein said wedge follower is laterally moveable towards and away from the transducer element adjacent thereto.

16. The invention as defined in claim 1 wherein the wedge has a wedge angle $\theta$ and wherein tan $\theta \leq$ the coefficient of friction between the mating surfaces of the wedge element and the wedge follower element.

* * * * *

UNITED STATES PATENT OFFICE
CERTIFICATE OF CORRECTION

Patent No. 4,037,264     Dated July 19, 1977

Inventor(s)  John A. Barkley et al.

It is certified that error appears in the above-identified patent and that said Letters Patent are hereby corrected as shown below:

Column 3, line 12, " $\frac{\theta}{\tan}$ " should read -- tan θ --.

Fig. 1, should appear as shown on the attached sheet.

Signed and Sealed this

Twenty-first Day of March 1978

[SEAL]

Attest:

RUTH C. MASON
Attesting Officer

LUTRELLE F. PARKER
Acting Commissioner of Patents and Trademarks

Page 2 of 2

UNITED STATES PATENT OFFICE
CERTIFICATE OF CORRECTION

Patent No. 4,037,264         Dated July 19, 1977

Inventor(s) John A. Barkley et al.

It is certified that error appears in the above-identified patent and that said Letters Patent are hereby corrected as shown below:

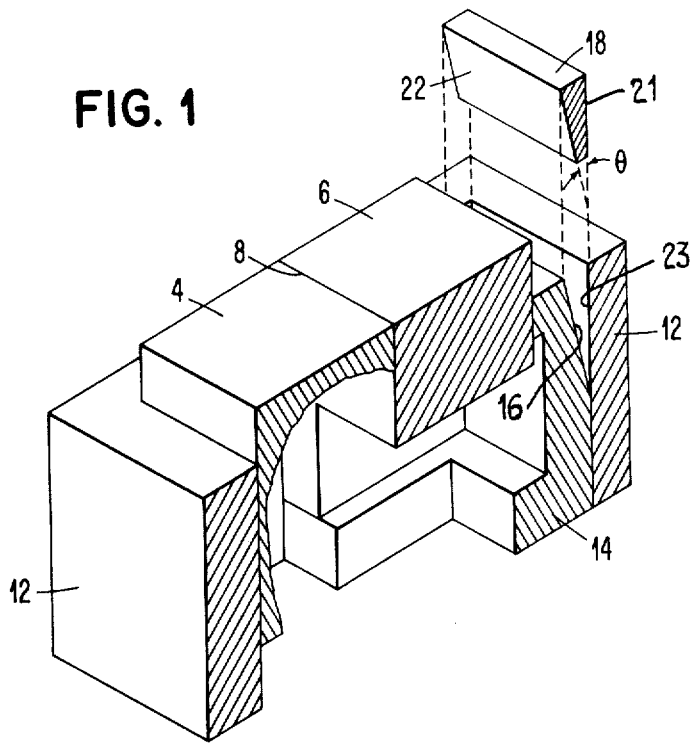

FIG. 1